Figure 3:
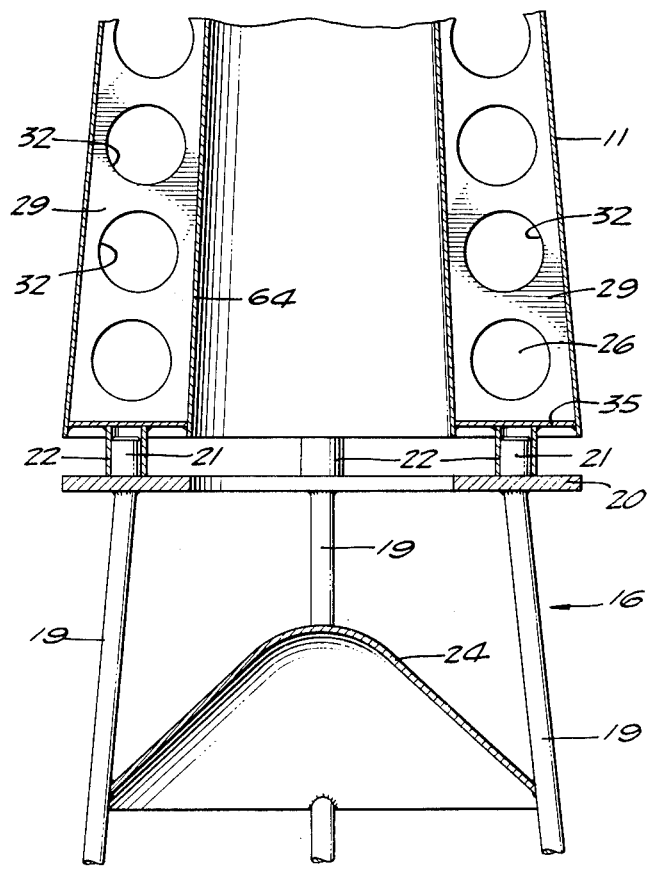
Figure 5:
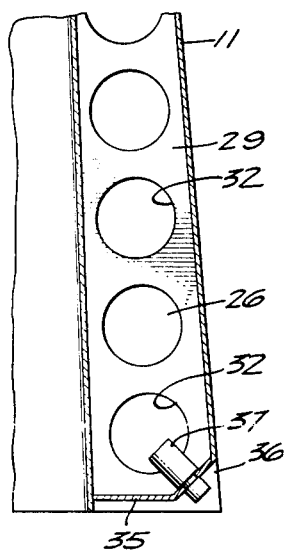
Figure 4:
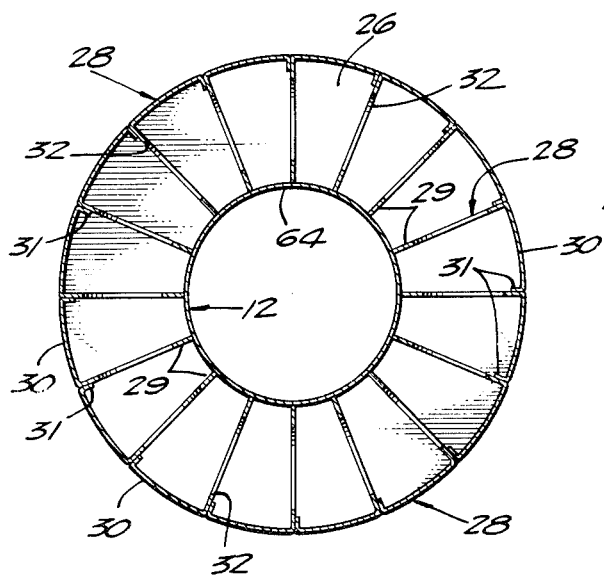

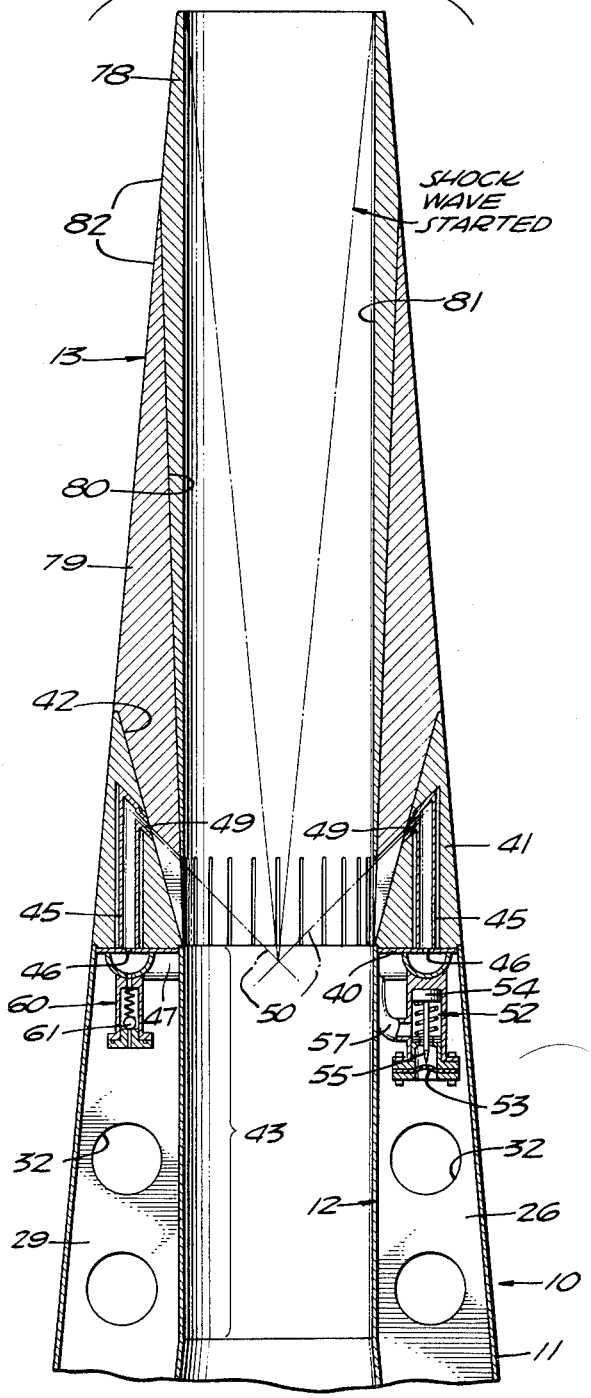
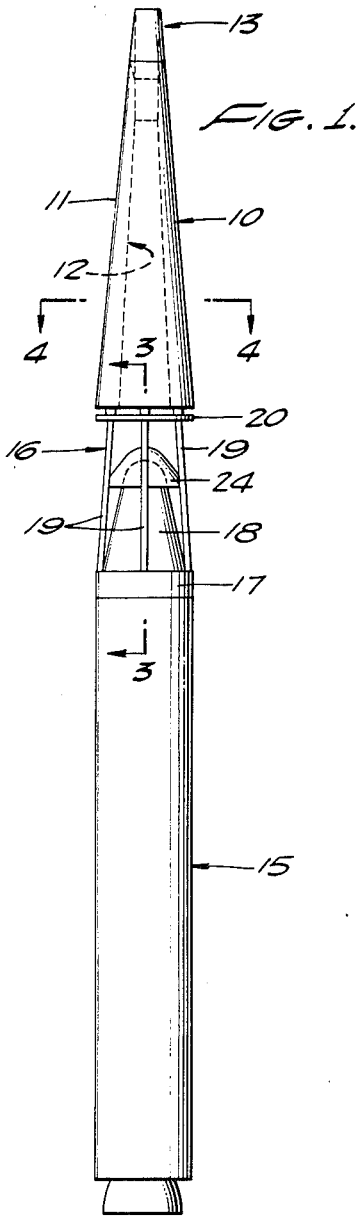

BARRY V. RHODES
DANIEL E. BLOXSOM
INVENTORS

BY
ATTORNEY

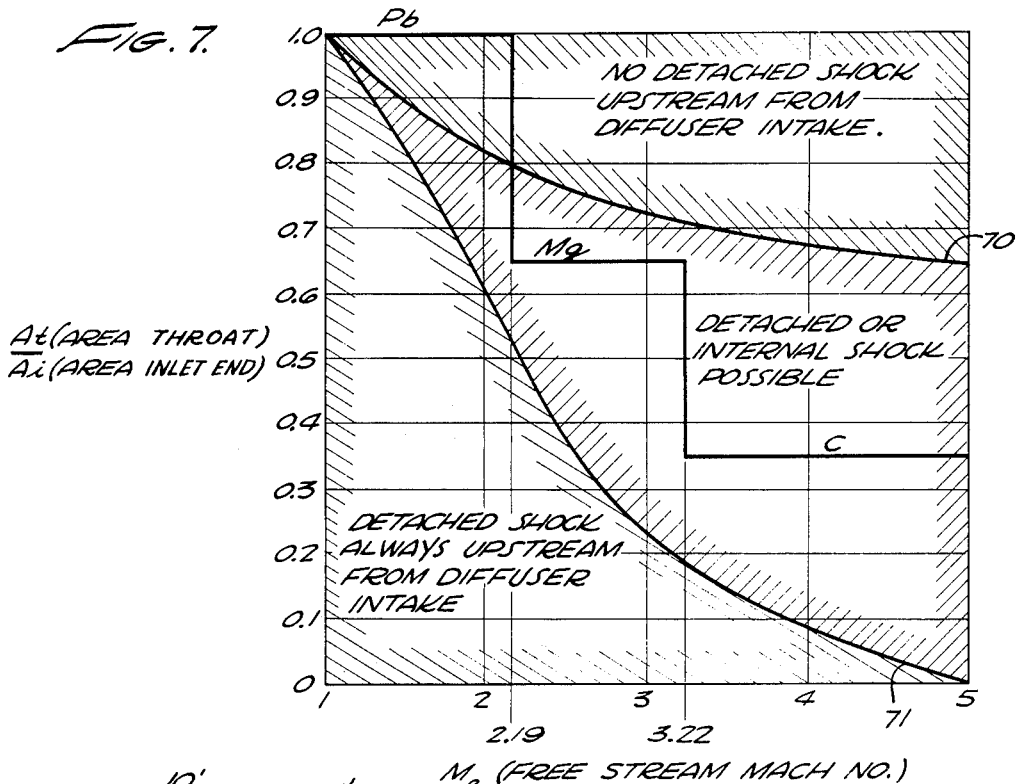
FIG. 7.
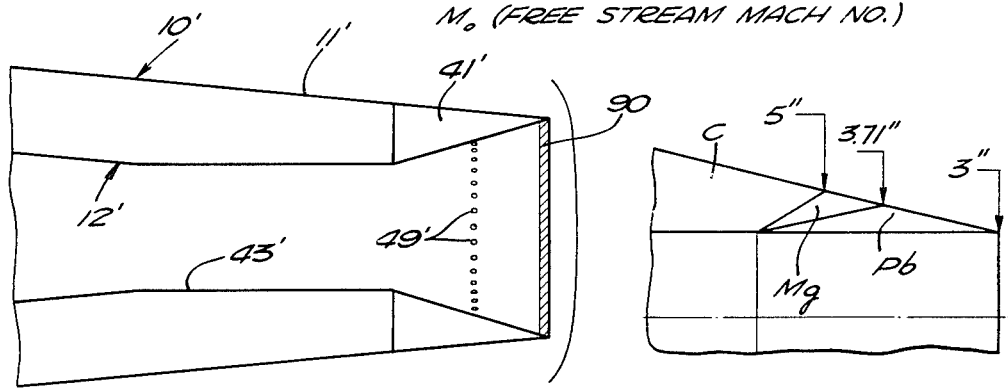
FIG. 6.   FIG. 8.
| T STAG. °K | M# | MAT'L | INLET RADIUS DURING LAUNCHING |
|---|---|---|---|
| 589 | 2.19 | Pb | 3.00 |
| 924 | 3.22 | Mg | 3.11 |
| 4000 | 12 | C | 5.00 |
FIG. 9.
BARRY V. RHODES
DANIEL E. BLOXSOM
INVENTORS

United States Patent Office 3,224,190
Patented Dec. 21, 1965

3,224,190
JET POWER PLANT PARTICULARLY
FOR AIRCRAFT
Bruno Eckert, Stuttgart-Bad Cannstat, Germany, assignor to Daimler-Benz Aktiengesellschaft, Stuttgart-Unterturkheim, Germany
Original application Feb. 11, 1959, Ser. No. 792,624. Divided and this application July 20, 1964, Ser. No. 395,973
Claims priority, application Germany, Feb. 14, 1958, D 27,424
2 Claims. (Cl. 60—35.54)

This application is a division of parent application Serial Number 792,624, filed February 11, 1959, now abandoned.

The present invention relates to a jet power plant, particularly for powering aircraft provided with afterburner means for increasing the thrust thereof.

Of late, afterburning is employed to an ever increasing degree for increasing the thrust of jet engines. This is accomplished by injecting additional fuel into the oxygen-rich mixture after it leaves the turbine. With such an afterburner, additional combustion is achieved by means of which the temperature of the gases at the end of the thrust tube is raised and whereby the thrust energy of the power plant is correspondingly increased.

The object of the present invention is to provide a jet engine with deflector means by means of which the gas stream is adapted to be selectively deflected from its normal direction of discharge from the power plant, preferably downwardly, for example, as take-off assist or during landing thereof.

This is accomplished in the present jet power plant arrangement by providing means for selectively effecting a deflection of the discharged gas stream from its normal direction of discharge and to arrange this deflector means between the transition member that extends rearwardly of the gas turbine and the afterburner. It is thereby an advantage to operatively connect the deflector device and the afterburner with each other in such a manner that when the gas stream is deflected from its normal direction, the afterburner is automatically shut of.

The deflector device is advantageously constructed as a uniform or symmetrical intermediate member with equal connecting means on both sides thereof and with the external shape thereof substantially conforming to the external shape of the thrust tube. As such, it may be detachably mounted between the transition member and the thrust tube. With such a construction the deflector device may be removed and the power plant may be operated without the deflector.

The reflector device may be constructed so as to be rotatable as a unit about the jet tube axis, that is, at least over a certain range. As a result of such rotation the gas stream discharged from the deflector device may be pointed in various directions within a plane perpendicular to the axis of the thrust tube whereby the maneuverability of the aircraft is improved. The deflection of the gas stream relative to the longitudinal axis of the thrust tube is approximately 90°. The deflector device may also be provided with one or a plurality of discharge openings the axis or axes of which are disposed essentially perpendicularly to the axis of the thrust tube and the cross-sectional area of the discharge opening or openings of which may be made about equal to the cross-sectional area of the thrust tube.

In one embodiment according to the present invention, the deflector is formed as a spherically cup-shaped or dish-shaped flap or valve which is rotatable about an axis disposed transversely through the center line of the thrust tube and which may be rotated between a first position in which it closes off the discharge opening and a second position in which it closes off the thrust tube.

According to another embodiment of the present invention, at least one segmentally-shaped flap is provided which essentially conforms to the interior contour of the thrust tube walls and which is rotatable about a transverse shaft disposed in close proximity to the walls of the thrust tube. Finally it is also possible to arrange a flap of air-foil shape cross-section in the thrust tube which may be selectively adjusted parallel to or at right angles to the axis of the thrust tube.

Accordingly it is an object of the present invention to provide a jet engine with a deflector means for deflecting the gases from normal discharge direction thereof to thereby provide effectively an assist during take-off and during the landing thereof.

Another object of the present invention resides in that a jet engine is provided with deflector means which is rotatable about a longitudinal axis thereof to improve thereby the maneuverability of the aircraft.

Still another object of the present invention resides in the provision of a deflector device for a jet engine formed as a readily detachable subassembly.

A further object of the present invention lies therein that the afterburner is automatically shut off when the deflector is brought into operation in which it deflects the gases from the normal direction of flow thereof.

These and further objects, features and advantages of the present invention will become more obvious from the following description when taken in connection with the accompanying drawing which shows, for purposes of illustration only, several embodiments in accordance with the present invention, and wherein:

FIGURE 1 illustrates a partial longitudinal cross-sectional view of a deflector device according to the present invention, FIGURE 2 illustrates another embodiment of a deflector device also in partial cross-section according to the present invention, and FIGURE 3 shows a deflector device partially in cross-section that is rotatable about the thrust tube axis.

Referring now to the drawing wherein like reference numerals are used throughout the various views to designate like parts, and more particularly to FIGURE 1, reference numeral 12 generally designates a deflector device for a jet engine of any suitable conventional construction, which deflector device 12 is attached to a transition member 10 extending rearwardly of the compressor turbine 11. A thrust tube 13 adjoins the deflector device 12 with an afterburner 14 arranged in the thrust tube 13 and provided, for instance, with annularly arranged fuel nozzles by means of which the thrust of the discharging gas jet is increased in a known manner.

The deflector device 12 in accordance with the present invention is provided with a downwardly directed discharge opening 15 the axis of which is disposed perpendicularly or at least nearly perpendicularly to the axis 16 of the thrust tube 13. This discharge opening 15 may be closed by a spherically cup-shaped or dish-shaped valve or flap 17 which is swingable about a shaft 18 that extends transversely through the axis of the thrust tube 13. The rotation of the shaft 18 through an arc of about 90° may be accomplished by the pilot by means of a linkage 19, or the like, operatively connected to the shaft 18 at the outside of the deflector device 12.

In the position indicated in FIGURE 1, the discharge opening 15 of the deflector device 12, shown in full lines, is closed by the valve or flap 17 and in this position the jet power plant operates in the usual manner by means of the rearwardly directed thrust tube 13. For increasing the thrust of the jet engine, the afterburner device 14 is brought into operation. If, for instance, during take-off or during landing of the aircraft the flap 17, by means of the linkage 19, is rotated into a position shown in FIGURE 1 in dotted lines the thrust tube 13 is closed off and the gas stream from the turbine 11 is deflected downwardly through the discharge opening 15. At the same time the fuel supply to the afterburner 14 may appropriately and automatically be cut off, for instance, in such a manner that a specially constructed quick-action valve located in the fuel supply line to the afterburner is closed by means of the movement of linkage 19 as illustrated in FIGURE 1.

According to FIGURE 1, the shaft 18 for the deflector valve 17 is disposed directly in the joint between the flanges 20. However, the deflector device 12 may also be constructed as an adapter member with the transverse shaft 18 disposed in the longitudinal center thereof in which case a flange arrangement 20' may be provided at a location indicated in FIGURE 1 by the dot-dashed lines. With such an arrangement the complete deflector assembly 12 may be detachably mounted between the transition member 10 and thrust tube 13. By making the connecting means on both sides of the deflector device 12 alike, that is, by constructing the flanges 21 and 20' alike, it is possible to easily remove the deflector device 12 and operate the jet propulsion unit without the deflector device 12 in which case the thrust tube 13 may be connected directly to the transition member 10.

The deflector device, as described above, may be improved with regard to the disposition of the valve or shaft axis 18. According to FIGURE 2, the deflector device generally designated by reference numeral 12' consists of segmentally-shaped flaps 22 mounted on shafts 23 which are rotatably mounted at a point close to the walls of the deflector device 12'. The disposition of the shafts 23, in the construction according to FIGURE 2, for obvious reasons is more advantageous for the normal operation of the jet engine inasmuch as it presents the minimum of obstruction to the gas stream. The flaps 22 are segmentally shaped and are formed so as to readily conform to the walls of the deflector device 12' when in the open position.

In the position as shown in FIGURE 2 in full lines, the flaps 22 form a cone the base of which is disposed perpendicularly to the axis 16 of the thrust tube 13 while the apex of the cone lies within axis 16 of the thrust tube 13. By means of this cone the flow area of the thrust tube 13 is closed off and at the same time the downwardly directed discharge passage 15' is opened. In order to facilitate the flow of the gases around the cone, the walls of the deflector device 12' are bulged outwardly in a toroidal manner in the region 24 adjacent the cone. As shown in FIGURE 2, the walls of the deflector device 12' extend rearwardly to form the walls of the thrust tube 13. However, the two parts 12' and 13 may constitute separate units.

The flaps 22 may appropriately be operated from the outside of the deflector device 12' by means of a linkage or the like and rotated so that they will lie closely against the walls of the deflector device 12' as indicated in dotted lines in FIGURE 2. In this manner the normal cross-sectional area of the thrust tube becomes available for the passage of the gases, while at the same time, the lateral discharge opening 15' is closed. As described above in connection with the embodiment according to FIGURE 1, an operative connection between the deflector device 12' and the afterburner 14 may also be provided with the arrangement according to FIGURE 2.

In actual construction of the arrangement according to FIGURE 2, a plurality of lateral discharge openings may be provided in the deflector device 12', each being controlled individually by a segmentally-shaped flap similar to flap 22. The total cross-section flow area of the discharge openings is thereby made essentially equal to the total cross-sectional flow area of the thrust tube 13.

According to FIGURE 3, the deflector device 12" is constructed as a separate adapter member which may be mounted between the transition member 10 and the thrust tube 13 by means of flanges 25. Again a discharge opening 15" is provided the axis of which is disposed perpendicularly to the axis 16 of the thrust tube 13. For the deflection of the gases an air-foil shaped valve 26 is provided which is rotatably mounted within the deflector device 12" in a plane including the axis 16 of the thrust tube 13. By means of a swivel mechanism, as shown in FIGURE 2, the valve 26 may be rotated from a position parallel to the axis 16, as shown in full lines in FIGURE 3 to a position inclined with the axis 16 of the thrust tube 13 as shown in dotted lines. In this last-mentioned position the gas stream from the turbine 11 is deflected from its normal direction of flow through the lateral discharge openings 15".

According to FIGURE 3, the deflector device 12" is rotatable as a complete unit about the thrust tube axis 16 so that the discharge opening 15" may be turned to any desired position in a plane perpendicular to the axis 16. For rotating the deflector device 12" a ring gear 28 is provided which is attached to the walls of the deflector device 12" and which is in engagement with a drive gear 29. This gear 29 may, for instance, be driven by means of a flexible shaft for obtaining the desired displacement of the discharge opening 15".

The swivel mechanism for rotating the valve 26 from a position parallel to the axis 16 to a position inclined thereto while the deflector unit 12" is in any angular position may consist, as indicated in FIGURE 3, of a grooved member of muff 30 which partially surrounds the deflector unit 12" and which is in engagement with a pin 32 provided on the free end of a lever 21 attached to one or both ends of the shaft 18' on the outside of the deflector unit 12". The grooved member 30 may be slidably mounted, for instance, on the stationary shaft driving the gear 29. An axial movement of member 30 effects a rotation of the valve 26 by means of the engagement of pin 32 with the annular groove or slot provided in member 30.

While I have shown and described several embodiments in accordance with the present invention, it is understood that the same is not limited thereto but is susceptible of many changes and modifications within the spirit of the present invention and I therefore do not wish to be limited to the details shown and described herein but intend to cover all such changes and modifications as encompassed by the scope of the appended claims.

I claim:
1. A jet power plant, particularly for the propulsion of aircraft having afterburner means for increasing the thrust thereof, comprising a turbine, housing means for said turbine, a thrust tube having a longitudinal axis along which the gases from said turbine discharge under normal operation of said power plant, said afterburner means being arranged within said thrust tube, deflector means effectively arranged between said housing means and said thrust tube for selectively deflecting the gas stream from the normal direction of flow, said deflector means being provided with a single opening for discharging the deflected gas stream therethrough, the axis of said discharge opening forming an angle with respect to the longitudinal axis of said thrust tube while the cross sectional area of said discharge opening is essentially equal to the cross sectional area of said thrust tube, and means for operatively connecting said deflector means with said afterburner means for automatically shutting off said afterburner means when said deflector means deflects the gas stream from the normal direction of flow thereof, said deflector means comprising two transversely extending shaft means rotatably mounted in the walls adjacent said deflector means, two segmentally-shaped valve means each mounted on one of said shaft means, means for selectively rotat- ing said shaft means together with said valve means to a first position for closing said discharge opening and to a second position for closing said thrust tube, the two segmentally-shaped valve means forming a cone when in said first position, the apex of said cone being directed up stream and coinciding with the longitudinal axis of said thrust tube, the walls of said deflector means being bulged outwardly adjacent said cone so as to facilitate the flow of gases around said cone during discharge thereof through said opening.

2. A jet power plant, particularly for the propulsion of aircraft having afterburner means for increasing the thrust thereof, comprising a turbine, housing means for said turbine, a thrust tube having a longitudinal axis along which the gases from said turbine discharge under normal operation of said power plant, said afterburner means being arranged within said thrust tube, deflector means effectively arranged between said housing means and said thrust tube for selectively deflecting the gas stream from the normal direction of flow, said deflector means being provided with a single opening for discharging the deflected gas stream therethrough, the axis of said discharge opening forming an angle with respect to the longitudinal axis of said thrust tube while the cross sectional area of said discharge opening is essentially equal to the cross sectional area of said thrust tube, and means for operatively connecting said deflector means with said afterburner means for automatically shutting off said afterburner means when said deflector means deflects the gas stream from the normal direction of flow thereof, said deflector means comprising three transversely extending shaft means rotatably mounted in the walls adjacent said deflector means, three segmentally-shaped valve means each mounted on one of said shaft means, means including link means for selectively rotating said shaft means together with said valve means to a first position for closing said discharge opening and to a second position for closing said thrust tube, the three segmentally-shaped valve means forming a cone when in said first position, the apex of said cone being directed up stream and coinciding with the longitudinal axis of said thrust tube, the walls of said deflector means being bulged outwardly adjacent said cone so as to facilitate the flow of gases around said cone during discharging thereof through said opening.

References Cited by the Examiner

UNITED STATES PATENTS

| 2,637,164 | 5/1953 | Robson et al. | |
| 2,658,334 | 11/1953 | Marchant | 60—35.54 |
| 2,681,548 | 6/1954 | Kappus | 60—35.54 |
| 2,753,685 | 7/1956 | Mattenson. | |
| 2,774,554 | 12/1956 | Ashwood et al. | |
| 2,814,931 | 12/1957 | Johnson. | |
| 2,849,861 | 9/1958 | Gardiner et al. | 60—35.54 |
| 2,857,119 | 10/1958 | Morguloff et al. | 244—52 |
| 2,857,740 | 10/1958 | Hall et al. | |
| 2,944,394 | 7/1960 | Peregrine | 60—35.54 |
| 2,944,395 | 7/1960 | Doak | 60—35.54 |
| 2,996,881 | 8/1961 | Gardiner | 60—35.54 |

FOREIGN PATENTS

| 644,011 | 10/1950 | Great Britain. |
| 723,160 | 2/1955 | Great Britain. |
| 732,127 | 6/1955 | Great Britain. |
| 733,931 | 7/1955 | Great Britain. |
| 735,645 | 8/1955 | Great Britain. |
| 745,637 | 2/1956 | Great Britain. |
| 127,172 | 10/1948 | Sweden. |

SAMUEL LEVINE, *Primary Examiner.*